No. 688,518. Patented Dec. 10, 1901.
H. C. HERR.
ROTARY ENGINE.
(Application filed Mar. 22, 1900.)
(No Model.) 7 Sheets—Sheet 1.

Witnesses. Inventor.
Henry C. Herr.
By
A. J. Sangster, Attorney.

No. 688,518. Patented Dec. 10, 1901.
H. C. HERR.
ROTARY ENGINE.
(Application filed Mar. 22, 1900.)

(No Model.) 7 Sheets—Sheet 2.

Witnesses.
L. M. Billings
G. A. Neubauer

Inventor.
Henry C. Herr.
By A. J. Sangster, Attorney.

No. 688,518. Patented Dec. 10, 1901.
H. C. HERR.
ROTARY ENGINE.
(Application filed Mar. 22, 1900.)
(No Model.) 7 Sheets—Sheet 3.

Witnesses. Inventor.

No. 688,518. Patented Dec. 10, 1901.
H. C. HERR.
ROTARY ENGINE.
(Application filed Mar. 22, 1900.)

(No Model.) 7 Sheets—Sheet 4.

Witnesses. Inventor.
L. M. Billings. Henry C. Herr.
G. A. Neubauer. By A. J. Sangster, Attorney.

THE NORRIS PETERS CO., PHOTO-LITHO., WASHINGTON, D. C.

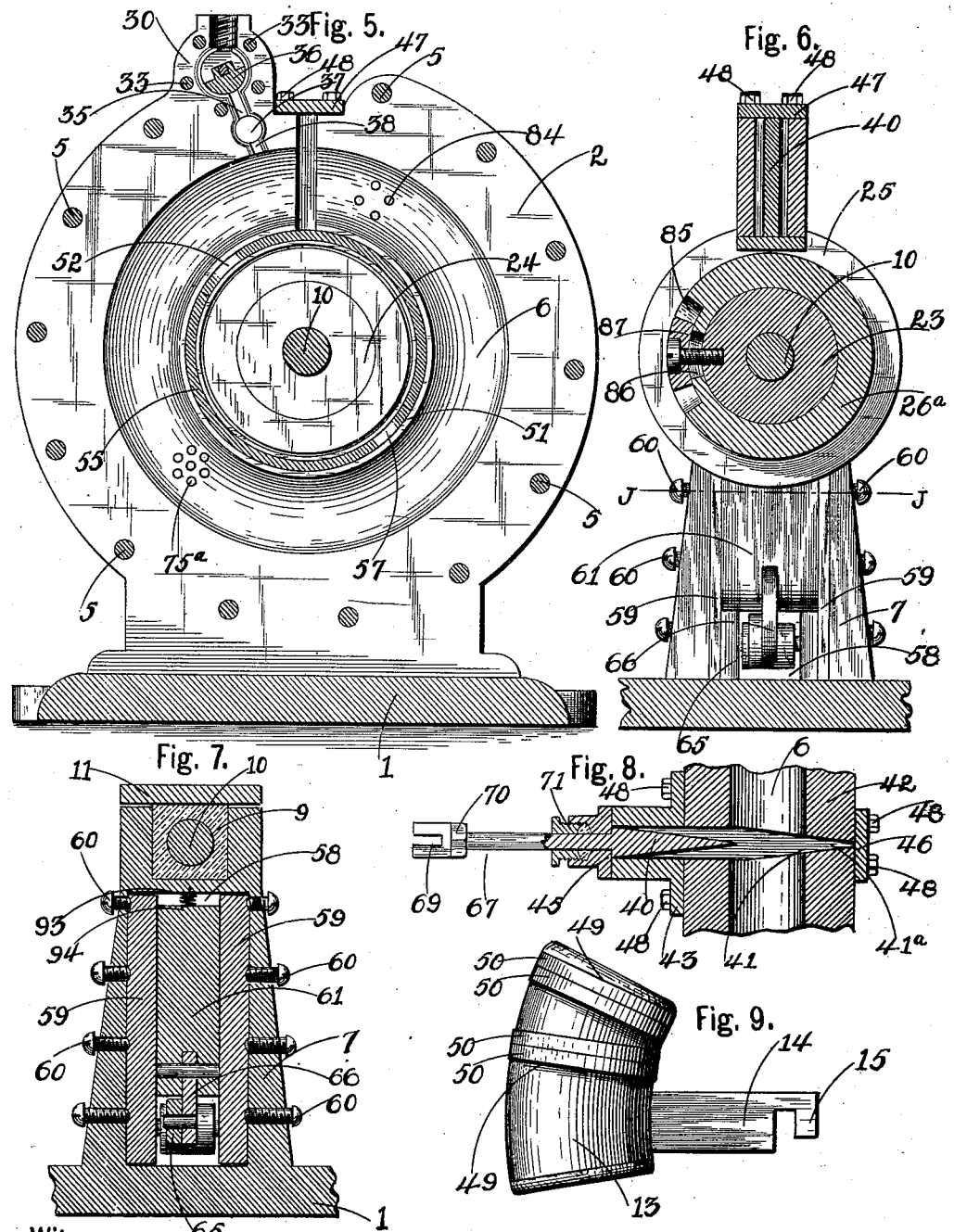

No. 688,518. Patented Dec. 10, 1901.
H. C. HERR.
ROTARY ENGINE.
(Application filed Mar. 22, 1900.)
(No Model.) 7 Sheets—Sheet 6.
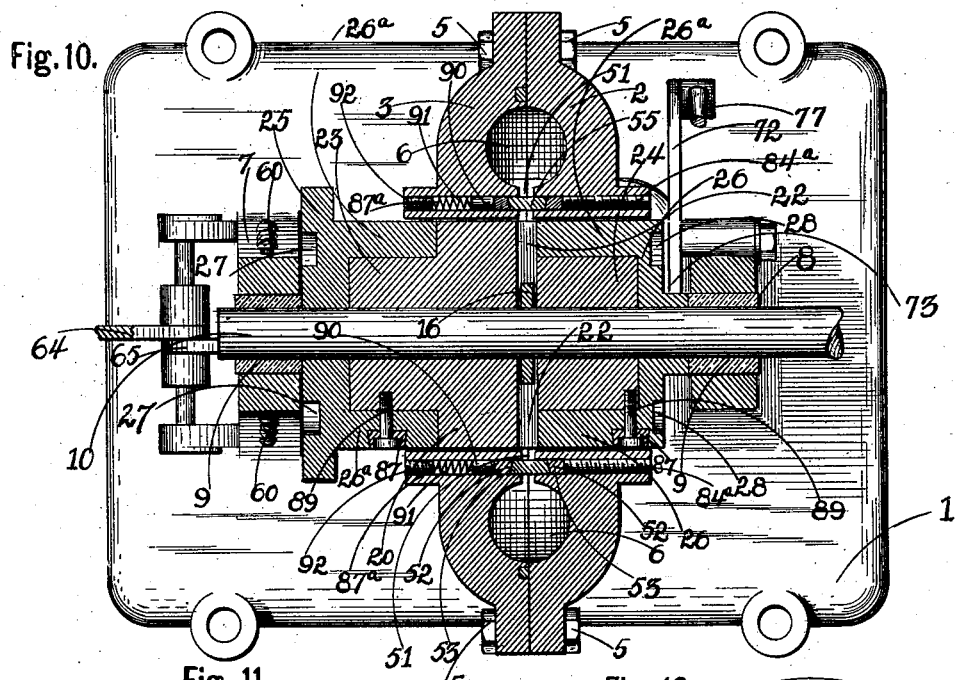
Fig. 10.
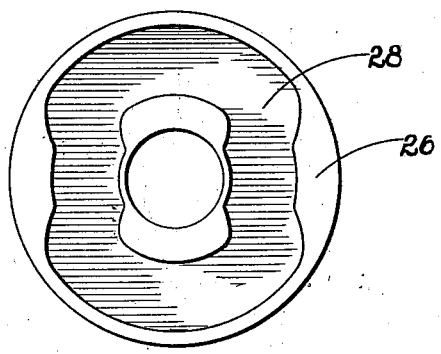
Fig. 11.
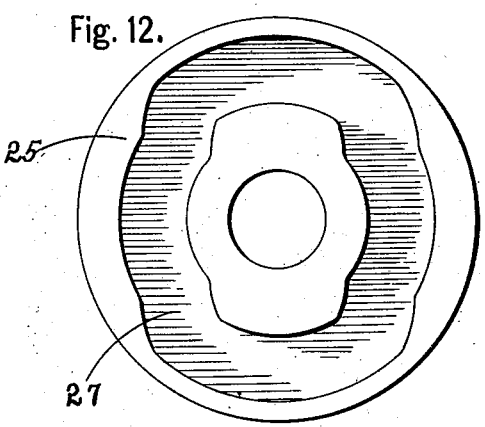
Fig. 12.
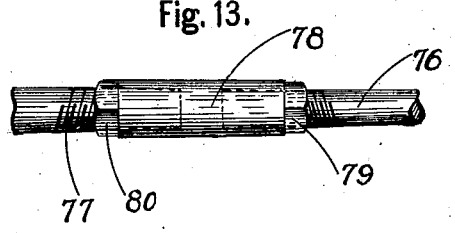
Fig. 13.
Fig. 14.
Witnesses.
L. M. Billings.
G. A. Neubauer.
Inventor.
Henry C. Herr.
By
A. J. Sangster, Attorney.
THE NORRIS PETERS CO., PHOTO-LITHO., WASHINGTON, D. C.

No. 688,518. Patented Dec. 10, 1901.
H. C. HERR.
ROTARY ENGINE.
(Application filed Mar. 22, 1900.)
(No Model.) 7 Sheets—Sheet 7.
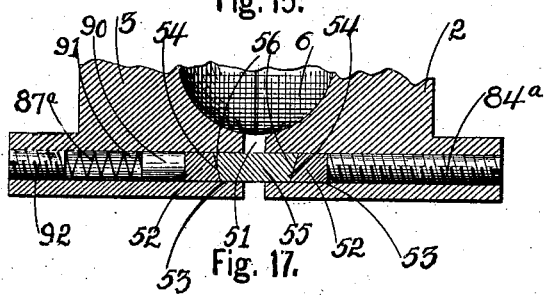
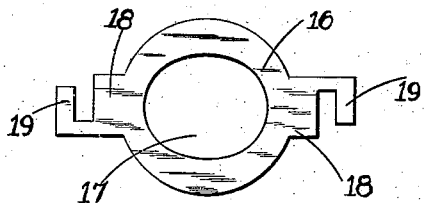
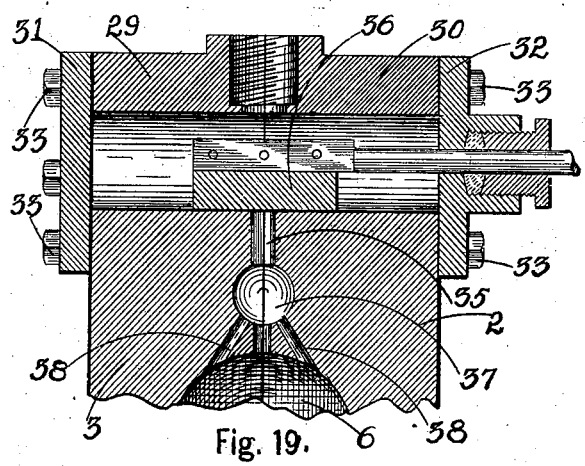
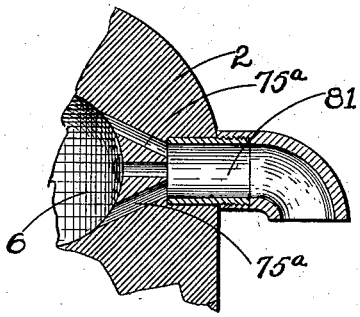
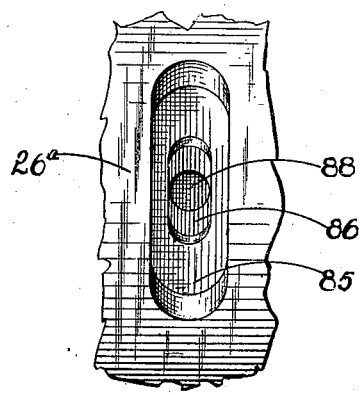
Witnesses. Inventor.
L. M. Billings. Henry C. Herr.
G. A. Neubauer. By A. J. Sangster, Attorney.

UNITED STATES PATENT OFFICE.

HENRY C. HERR, OF PORT HURON, MICHIGAN.

ROTARY ENGINE.

SPECIFICATION forming part of Letters Patent No. 688,518, dated December 10, 1901.

Application filed March 22, 1900. Serial No. 9,695. (No model.)

*To all whom it may concern:*

Be it known that I, HENRY C. HERR, a citizen of the United States, residing at Port Huron, in the county of St. Clair and State of Michigan, have invented certain new and useful Improvements in Rotary Engines, of which the following is a specification.

My invention relates to an improved rotary engine in which the pistons balance each other, being so connected together that the centrifugal force exerted against one is equalized by the centrifugal force exerted against the other; and the main objects of the invention are to reduce the friction to a minimum and produce a simple and practical engine of the type described.

For a full understanding of the merits and advantages of the invention reference is to be had to the accompanying drawings and the following description.

The invention is susceptible to various changes in the form, proportion, and minor details of construction without departing from the principle or sacrificing any of the advantages thereof, and to a full disclosure of the invention an adaptation thereof is shown in the accompanying drawings, in which—

Figure 1:
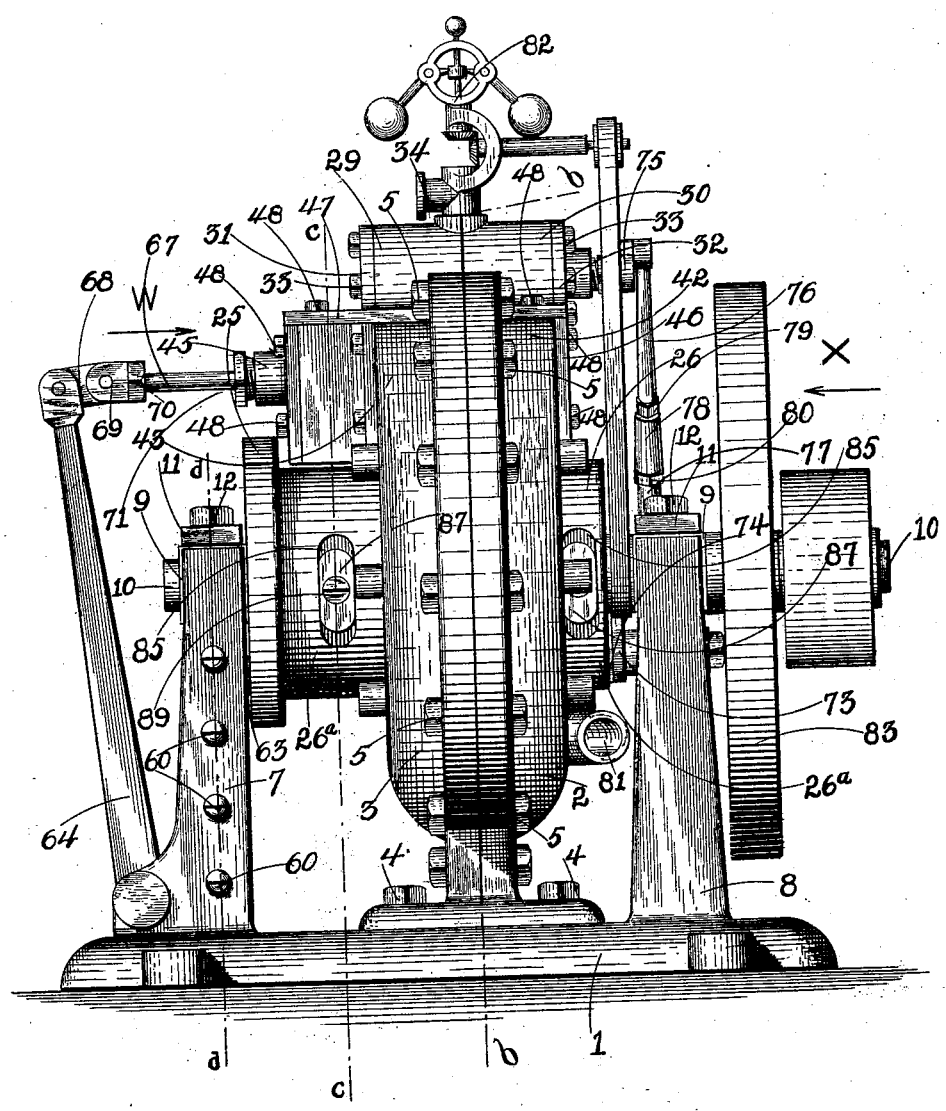
Figure 2:
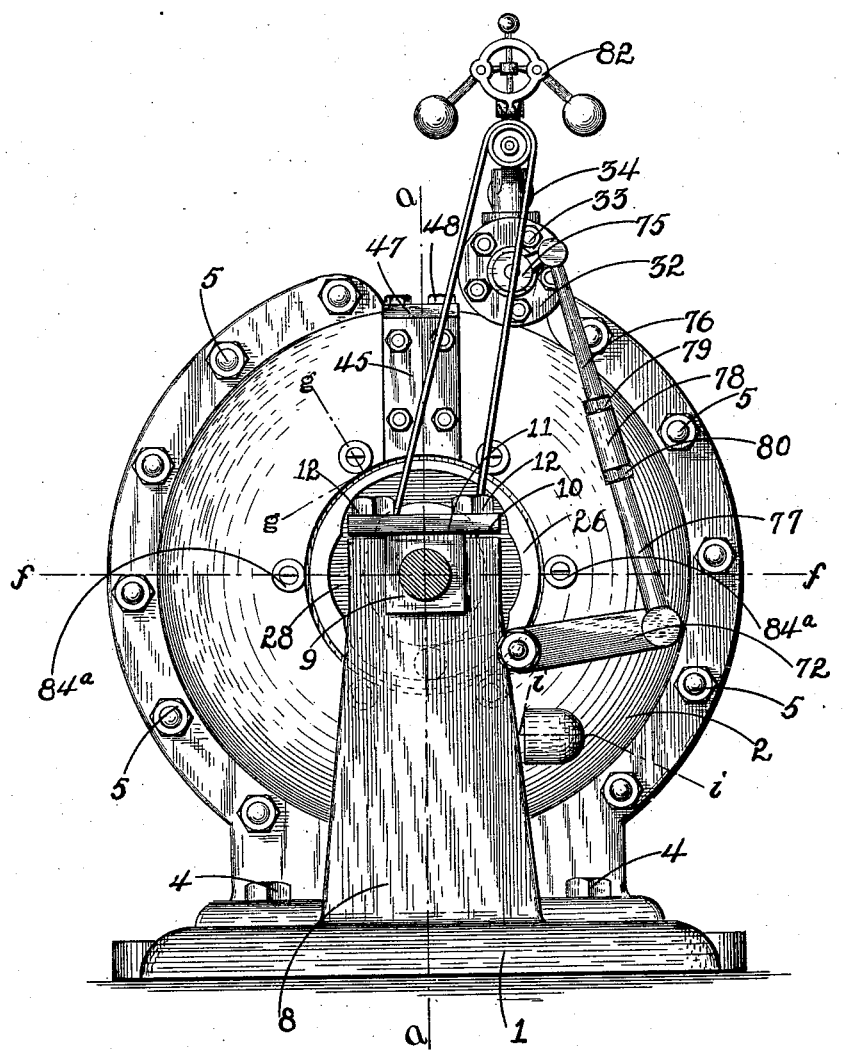
Figure 3:
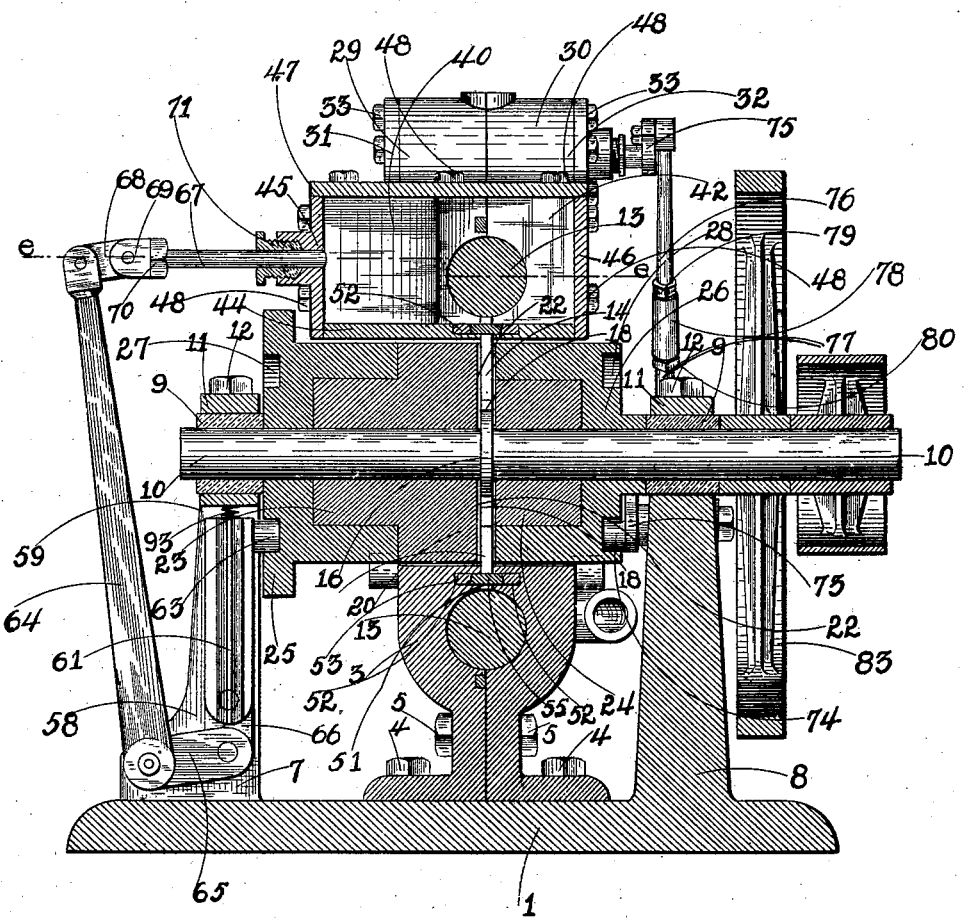
Figure 4:
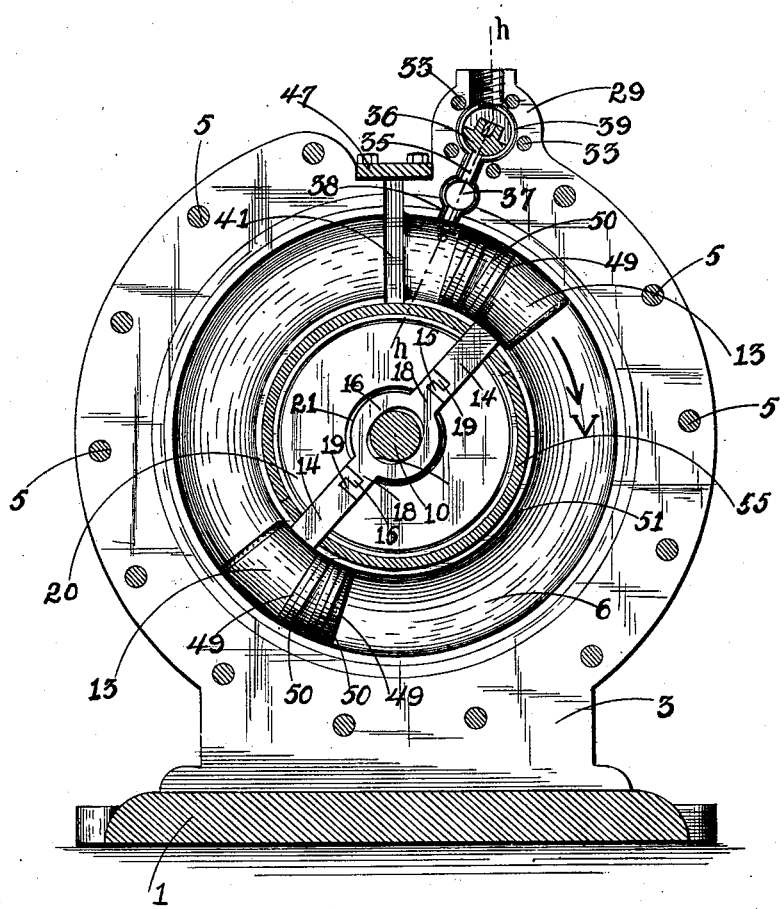

Figure 1 is an end elevation of my improved engine. Fig. 2 is a side elevation looking in the direction of the arrow X, Fig. 1. Fig. 3 is a transverse vertical section on or about line $a\ a$, Fig. 2. Fig. 4 is a longitudinal vertical central section on or about line $b\ b$, Fig. 1, looking in the direction of the arrow X. Fig. 5 is a longitudinal vertical central section on or about line $b\ b$, Fig. 1, looking in the direction of the arrow W. Fig. 6 is a vertical section on or about line $c\ c$, Fig. 1, to illustrate the adjustment of the cam portions. Fig. 7 is a vertical section on or about line $d\ d$, Fig. 1, to show the gibs and their adjustment. Fig. 8 is a horizontal section on line $e\ e$, Fig. 3, to illustrate the valve-gate. Fig. 9 is an enlarged detached view of one of the segmental pistons. Fig. 10 is a horizontal section on line $f\ f$, Fig. 2. Fig. 11 is an enlarged detached face view of the cam portion operating the steam-chest valve. Fig. 12 is an enlarged detached face view of the cam portion operating the valve-gate. Fig. 13 is an enlarged fragmentary view of the extensible connection. Fig. 14 is an enlarged fragmentary view of the outer end of the valve-gate rod, its adjustable enlargement, the connecting-link, and a portion of the lever-arm. Fig. 15 is an enlarged fragmentary section on or about line $g\ g$, Fig. 2, to illustrate the spring-tensioned adjusting-screws for the beveled rings. Fig. 16 is an enlarged detached view of the collar to which the pistons are connected. Fig. 17 is a fragmentary section on or about line $h\ h$, Fig. 4, to show the construction of the inlet-port. Fig. 18 is a fragmentary section on or about line $i\ i$, Fig. 2, to illustrate the construction of the exhaust-port. Fig. 19 is an enlarged fragmentary view of the circular flange to show the construction of the slots to adjust the cam. Fig. 20 is an enlarged section on line J J, Fig. 6.

In referring to the drawings in detail like numerals designate like parts.

The base 1 may be formed in any well-known shape and of any suitable metal, and the steam-cylinder is preferably formed in two halves 2 and 3, which are bolted to the base by the bolts 4 and to each other around their outer edges by the annular series of bolts 5. These half portions each have an annular depression forming half of the circular cylinder-chamber 6 and are nearly duplicates of each other. Standards 7 and 8, which are preferably formed integral with the base, extend vertically upward therefrom on either side of the cylinder portion and are provided with top depressions (see Fig. 2) to receive journal-boxes 9, in which the horizontal driving-shaft 10 is journaled. These boxes are secured in place by the top plates 11 and the bolts 12. The annular cylinder-chamber 6 is preferably circular in cross-section, and the pistons 13 are formed to correspond in cross-section and are segments of an annular ring shaped to fit within the cylinder-chamber, the forward ends being slightly rounded to prevent cutting the circular wall of the chamber. These segmental pistons are provided with thin flat extensions 14, having interlocking hook ends 15, and a collar 16, loosely fitted upon the shaft 10, and having an oblong central opening 17, through which the shaft passes to allow a certain amount of play, is provided with extensions 18, arranged opposite each other and having hook ends 19, with which the hook ends 15 of the pistons are adapted to interlock. The hook ends of the piston and collar extensions are practically the same in form and size, so that when interlocked continuous strips of substantially straight exterior lines connect the pistons to the collar.

A hub is rigidly mounted on the shaft within the circular opening of the steam-cylinder and preferably comprises a circular portion 20, having a central opening through which the shaft passes, a circular recess 21 on its inner face, which is concentric with the central opening, straight recesses or grooves 22, extending oppositely from the circular recess through the periphery of the circular portion and an integral reduced outer part 23, an annular portion 24, corresponding in shape and form to the reduced outer part 23 of the circular portion, and two outer cam portions 25 and 26, each of which is provided with a circular flange $26^a$, adapted to fit over the reduced outer part 23 and the annular portion 24, respectively. These portions 25 and 26 are provided with grooves or recesses 27 and 28 upon their exterior sides, which form cam depressions and serve to operate the mechanism controlling the admittance of steam, and a gate device for closing the annular steam-chamber against the passage of steam in one direction. The collar 16 is fitted in the circular recess 21, which is sufficiently larger than the collar to allow a limited lateral movement, and the interlocked extensions 14 and 18 are fitted in the grooves 22, being held in place by the annular portion 24 and the cam portion 25.

A steam-chest is mounted on the steam-cylinder, the cylinder portion of which is preferably formed in two parts 29 and 30, one part being integral with each half of the steam-cylinder. The ends of the cylinder portion of the steam-chest are closed by the plates 31 and 32, secured firmly in place by tie rods or bolts 33, and the chest is provided with a connection 34 for a steam-pipe, an entrance or inlet port 35, extending into communication with the steam-chamber in the cylinder for admitting steam into said cylinder, and a rotating valve-port 36. The entrance or inlet port 35 enlarges internally to form a chamber 37, and a plurality of small apertures or openings 38 extend from this chamber through the wall of the annular chamber 6 and into steam connection with said annular chamber. The object in employing a plurality of small apertures in this construction instead of a single large one is to avoid the formation of a shoulder sufficiently large to be struck by the outer portion of the segmental pistons as they rotate in the steam-cylinder.

One half portion of the cylinder and steam-chest is provided with a groove, preferably substantially square in cross-section, which extends around the outer edge of the circular opening in the cylinder portion of the steam-chest, the entrance or inlet port opening, and the annular steam-chamber in the cylinder, and a packing 39, of lead or similar material, is fitted in said groove, thereby confining the packing to one point between the contacting surfaces of the half portions and obviating the use of sheet-packing or the packing of the entire surface. A box is formed at one portion of the steam-cylinder to receive a sliding valve-gate 40. This box is preferably formed by cutting a deep groove or depression 41 laterally across the cylinder, enlarging the cylinder part 2 to form the portion 42, enlarging the cylinder-half 3 to form the side extensions 43 and the bottom extension 44, and closing the ends and top by the end plates 45 and 46 and the top plate 47, which are rigidly drawn into place by stud-bolts 48, any suitable packing being placed between the plates and the edges of the cylinder portion to render the joints steam-tight. The valve-gate 40 is preferably rectangular in form and is beveled slightly, and the latter portion $41^a$ of the groove 41 is beveled correspondingly, so that when the gate is in its closed position it is wedged in place and forms a steam-tight joint. (See Fig. 8.) The portion of the annular chamber upon the entrance-port side and immediately adjacent to the groove 41 is preferably enlarged or ball-mouthed to form a tapering entrance for the segmental pistons 13, and the segmental pistons are provided with one or more peripheral grooves 49, in which annular packing-rings 50 are located, the ball-mouth serving to force the rings into the grooves 49 after they pass the gate-groove 41. These grooves 49 are preferably in the rear part of the piston, behind the extension 14, thereby arranging the packing-rings in the rear of said extension and preventing the escape of steam through the slot through which the extension passes. Two packing-rings are preferably seated in each groove, with their abutting ends arranged to break joints.

To pack the slot 51, through which the extensions 14 of the segmental pistons 13 extend, I preferably seat an annular ring 52 in the annular recess 53 in each of the halves of the cylinder, the recesses being concentric with and of lesser circumference than the annular cylinder-chamber and the inner edges 54 of the rings being slightly separated from each other and beveled, said edges extending diagonally inward and toward each other to form a wedge-seat. These rings 52 are preferably formed of steel, and as the recesses are deeper than the rings are wide the rings only partially fill the recesses. A central ring 55, of softer metal and having beveled edges 56, corresponding to the beveled edges of the rings 52, is preferably formed in two sections, each of which is provided with a narrow longitudinal slot 57 near its forward end, through which the extension 14 of one of the pistons 13 passes. The two parts of the sectional central ring 55 travel in unison, with the pistons and seat in the outer portion of the recesses 53 filling the space between the two rings 52.

The beveled edges of said ring 55 slide freely upon the inner beveled edges of the ring 52 until automatically forced into steam-tight contact with said rings 52 by pressure of the steam in the interior of the cylinder. A longitudinal opening 58 is cut in the standard 7, and two gibs 59 are mounted vertically in said opening, one against each side wall of the opening, and are adjusted toward each other to take up wear by the gib screws or bolts 60. A vertically-movable block 61 is supported between these gibs and has a pin carrying a roller 63, which travels in the cam-recess 27 of the portion 25 of the hub. A lever-arm 64 is pivoted to the standard 7 near the base and has a substantially right-angled extension 65, which is connected to the block 61 by a connecting-link 66, which is pivoted to the block and the extension 65. The upper extreme of the lever-arm 64 is connected to a rod 67, extending from the valve-gate through an opening in the end plate 45 by a connecting-link 68, which is pivoted at its outer end to the lever-arm and at its inner end to an enlarged portion 69, which is screwed upon the outer screw-threaded end of the rod 67, said enlarged portion having a short longitudinal adjustment upon the rod and being locked in position by a lock-nut 70. A stuffing-box 71 is employed to pack the opening through which the rod 67 passes. (See Fig. 3.)

The valve of the steam-chest is operated by a vibratile arm 72, one end of which is provided with a lateral extension 73, having a roller 74, which travels in the cam-recess 28 of the portion 26 of the hub, and the opposite end is connected by an extensible connection to the crank 75 of the valve part 36. The extensible connection is preferably formed as shown in the drawings, in which two rods 76 and 77 are joined by a tubular coupling or sleeve 78, the adjacent ends of the rods being oppositely screw-threaded, one having a right-hand thread and the other a left-hand thread, and the interior of the coupling being threaded accordingly. The connection is extended or lengthened by turning the sleeve in one direction and shortened by turning the sleeve in the opposite direction and is locked in position by the jam-nuts 79 and 80.

An exhaust-port is provided the inner portion of which consists of a plurality of small apertures 75$^a$, which open externally into a common opening 81 of larger diameter, the object of which is to prevent the formation of a larger opening in the side of the steam-chamber, which would permit the packing-rings 50 to expand, and thereby retard or stop the segmental pistons, or the sides of which would form shoulders against which the pistons might strike, as a large opening would permit a certain deflection from the circular course pursued by the pistons.

A governing device 82 is mounted upon the engine and is operated by a gearing connected by a belt to the driving-shaft. The fly-wheel 83 is unusually heavy to equalize the rotation of the shaft. An air-vent 84 is arranged in the cylinder to avoid air-pressure between the valve-gate and the inoperative rotating piston.

The cam portions 25 and 26 are adjustable on the driving-shaft to provide for adjusting the operation of the valve-gate and steam-chest valve relatively to the rotation of the pistons. The preferred construction of these adjusting devices is shown in Fig. 6, in which outer elongated depressions 85 are formed upon the periphery of the flanges 26 and 80 merge in the inner enlarged slots 86, which extend through the inner wall of the flange and are of narrower width than the outer depressions. Plates 87 are seated in the outer depressions, with portions of their bottom surface resting against the shoulders formed by narrowing the depressions at the bottom into the openings or slots 88, and are held rigidly in place by set-screws or bolts 89, which pass through the openings or slots into the inner portions of the hub. Two of these adjusting devices are preferably used and are arranged opposite each other to balance the hub. Sufficient adjustment is secured by loosening the set screws or bolts and turning the cam portions slightly. The annular rings 52 are adjusted laterally to a certain degree within the recesses in the hub to take up wear and also to centrally aline the central ring 55. One of the rings is preferably adjusted by an annular series of set-screws 84$^a$, arranged at suitable intervals and screwed through openings in the cylinder, with their ends impinging against the outer side of the ring, and the opposite ring is held in place against the central ring by a series of spring-tensioned pins 90, each pin being seated in a depression 91 and having a spiral spring 87$^a$ bearing against its outer end, the tension of the spring being regulated by the set-screw 92. By this means the ring can give slightly under pressure and is not held rigidly in place.

Spring mechanism is employed to assist the cam in forcing the valve-gate-operating block downward and is preferably formed as shown in the drawings, in which a spiral spring 93 has its lower end seated in a depression 94 in the top of the block 61 and acts as a spring-cushion to break the force of the upward movement of said block, and especially to accelerate the downward movement, and thus aid the cam in rapidly closing the valve-gate, the spring enabling the use of a short abrupt quickly-operating cam.

The operation of the engine is as follows: The pistons being in the position shown in Fig. 4 they are slowly rotated in the direction of the arrow V to close the valve-gate and open the valve of the steam-chest, thereby permitting the steam to enter the chamber. The pressure of the steam behind the operatively-arranged piston now forces it forward until it passes the exhaust-port, when the steam-chest valve closes the steam-exhaust and the gate again opens, permitting the passage of the opposite piston, when the above operation is repeated.

It will be observed from the foregoing description and the drawings that all of the operating parts are provided with adjustments both to take up wear and also to adjust the several operative parts relatively to each other. The extensible feature of the connection between the steam-chest valve and the vibratile arm and the longitudinally-adjustable enlarged portion at the outer end of the valve-gate rod affords an extremely fine adjustment independent of the adjustment of the cam portions.

I claim as my invention—

1. A rotary engine having an annular steam-chamber, a driving-shaft arranged centrally with respect to said chamber, and two oppositely-arranged pistons operating in said chamber, and a rigid connection between said pistons having a central collar loosely encircling the shaft and having a slight lateral play thereon; said pistons being arranged so that one will equalize the other.

2. A rotary engine having an annular steam-chamber, a driving-shaft arranged centrally with respect to said chamber, a collar loosely mounted on said shaft, and having opposite integral side extensions, a hub rigidly mounted on the shaft and inclosing the side extensions to prevent independent rotation of the collar, and two oppositely-arranged pistons operating in the chamber and having extensions interlocked with the side extensions of the collar.

3. A rotary engine having an annular steam-chamber, a driving-shaft arranged centrally with respect to said chamber, two pistons operating in said chamber, and a rigid connection between said pistons having an oblong opening through which the shaft passes.

4. A rotary engine having an annular steam-chamber, a driving-shaft arranged centrally with respect to said chamber, a collar having an elongated opening through which the shaft passes, two pistons operating in the chamber and rigidly connected to the collar and means for preventing rotation of the collar independent of the shaft.

5. In a rotary engine, the combination of a cylinder having a steam-chamber, a shaft, two pistons having projecting arms connected together by a collar, said collar having an opening through which the shaft passes and a central packing-ring formed in two sections each section having a longitudinal slot near its forward end through which one of the piston-arms passes, substantially as set forth.

6. A rotary engine comprising a cylinder having a steam-chamber, a shaft, two pistons unrotatably connected to the shaft and operating in the steam-chamber, a steam-chest having an inlet-port to the steam-chamber, a shut-off valve for said port, mechanism for operating said shut-off valve, and a sectional hub mounted on the shaft and having a cam-recess in one section in which a part of said mechanism travels, said cam-section having a certain range of adjustment on the remainder of said hub and means for locking the cam-section in its adjusted position.

7. A rotary engine comprising a cylinder having a steam-chamber provided with an inlet-port for the steam, a shaft, pistons operating in the steam-chamber and having a rigid connecting-rod provided with a central enlargement through which the shaft loosely passes, a hub rigidly mounted on the shaft and having means for preventing independent rotation of the connecting-rod, a vertically-arranged gate-valve for preventing the passage of steam in one direction in the steam-chamber, and mechanism operated from the hub for opening and closing said gate-valve.

8. A rotary engine comprising a cylinder having a steam-chamber provided with an inlet-port for the steam, a shaft, pistons having interlocking arms hung from the shaft and operating in the steam-chamber, a sectional hub rigidly mounted on the shaft and partly inclosing the interlocking piston-arms, a vertically-arranged sliding gate-valve for preventing the passage of steam in one direction in the steam-chamber, and mechanism operated from the sectional hub for opening and closing said sliding gate-valve.

9. A rotary engine comprising a cylinder having a steam-chamber provided with an inlet-port for the steam and a vertical tapering depression extending transversely to the steam-chamber, a shaft, pistons having interlocking arms hung from the shaft and operating in the steam-chamber, a hub rigidly mounted on the shaft partly inclosing the piston-arms, a wedge-shaped gate-valve sliding in the tapering depression to prevent the passage of steam in one direction in the steam-chamber, and mechanism operated from the hub for opening and closing the gate-valve.

10. A rotary engine comprising a cylinder having a steam-chamber, provided with an inlet-port for the steam and a tapering transverse depression, a shaft, two oppositely-disposed pistons operating in the steam-chamber and having arms connected to a common collar hung from the shaft, a wedge-shaped gate-valve sliding in the tapering depression to prevent the passage of the steam in one direction in the steam-chamber, mechanism for operating said gate-valve and inlet-port, and a hub rigidly mounted on the shaft and having openings for the passage of the piston-arms and cams controlling the operation of said valve-operating mechanism.

11. A rotary engine comprising a cylinder having a steam-chamber provided with a vertical tapering depression, and an inlet-port for the steam at one side of said depression, a shaft, two opposed pistons operating in the steam-chamber and having interlocking arms hung from the shaft, a hub unrotatably securing said piston-arms to the shaft without preventing lateral movement and having cams, valve means for supplying steam to the inlet-port operated from one of said cams, a wedge-shaped gate-valve sliding in the tapering transverse depression to prevent the passage of steam in one direction in the steam-chamber operated from the other cam.

12. A rotary engine having a cylinder provided with an annular steam-chamber, and a vertical depression extending transversely through the chamber, a shaft, a steam-chest having an inlet-port to the steam-chamber at one side of the vertical depression, a shut-off valve for said port, pistons having interlocking arms hung from the shaft and operating in the chamber, a valve-gate sliding in the vertical transverse depression, a hub mounted on the shaft and partially inclosing the interlocking arms of the pistons, and having a cam at each end, mechanism operated by one of said cams connected to the shut-off valve and mechanism operated by the other cam connected to the valve-gate.

13. A rotary engine having a cylinder provided with an annular steam-chamber, and a vertical depression extending transversely through the chamber, a shaft, a steam-chest having an inlet-port to the steam-chamber at one side of the depression, a rotary shut-off valve for said port, pistons having interlocking arms hung from the shaft and operating in the chamber, a valve-gate sliding in the transverse depression, a hub partially inclosing the piston-arms and having two independent cam devices mounted on the shaft, mechanism operated by the cams and connected to the shut-off valve and valve-gate and means for adjusting said cam devices on said hub and independently of each other.

14. In a rotary engine, the combination of a cylinder formed in two vertically-divided sections and having a steam-chamber, a shaft, two oppositely-disposed pistons each having an arm, a center collar hung from said shaft and having rigid connection with the piston-arms; the cylinder having an annular slot extending from the steam-chamber through the inner part of the cylinder to permit the passage of the piston-arms and interior and exterior packing for said steam-chamber, said interior packing including a two-part sectional ring having each part provided with a slot through which a piston-arm passes.

15. In a rotary engine, the combination of the cylinder having a steam-chamber formed in sections, a shaft, two opposed segmental pistons having interlocking arms hung from said shaft and sliding in said steam-chamber; the cylinder having an annular slot extending from the steam-chamber through the inner part of the cylinder to permit the passage of the piston-arms, unrotatable packing-rings mounted in the sides of the slot, a rotatable packing-ring supported between the unrotatable packing-rings and formed in two sections each having an opening through which a piston-arm passes; the rotatable packing-ring being forced into steam-tight position relatively to the unrotatable packing-rings by the pressure of the steam, and an interior packing surrounding the steam-chamber.

16. In a rotary engine, the combination of a cylinder having a steam-chamber, a shaft, two pistons having projecting arms connected together by a collar, said collar having an opening through which the shaft passes, a central packing-ring formed in two sections each section having a longitudinal slot near its forward end through which the piston-arms pass, said ring being mounted in annular grooves and having yielding side bearings to prevent friction when brought into steam-tight contact by the pressure of the steam from the steam-chamber, as set forth.

17. In an engine, the combination of a base, upright standards extending from said base, and one of said standards having a vertical slot, a horizontal shaft journaled in said standards, a cylinder, a piston connected to the shaft and sliding in the cylinder, a hub on the shaft and partially inclosing the piston-arm and having a cam, a valve device for said cylinder, gibs mounted in the slot in the standard, a block slidably mounted between said gibs and operated by the cam of the hub, and an angular arm connecting the block to the valve device.

18. In an engine, the combination with the machine-frame having a vertically-slotted standard, the driving-shaft and the cylinder, of a valve device for said cyinder, mechanism for operating said valve device and including a reciprocating block traveling in the slot in the standard, a hub on the shaft having a cam operating the reciprocating block, and a spiral spring between the top wall of the slot in the standard and the top of the block for assisting the cam in moving the block downward to close the valve device.

19. In an engine, the combination of a base, upright standards extending from said base, and one of said standards having a slot, a shaft journaled in said standards, a cylinder, a piston connected to the shaft and sliding in the cylinder, a valve device for said cylinder, gibs mounted in the slot in the standard, gib-screws extending through the standard for adjusting the gibs, a block slidably mounted between said gibs and operated from the shaft, and mechanism connecting the block to the valve device.

20. A rotary engine having a cylinder provided with an annular steam-chamber having an inlet-valve, and a valve-gate, a driving-shaft, pistons operating in the steam-chamber, and a hub formed in four portions rigidly mounted on the driving-shaft; the inner portions of the hub unrotatably securing the pistons to said driving-shaft, and the outer portions having means for operating the inlet-valve and valve-gate.

21. A rotary engine having a cylinder provided with a steam-chamber, a driving-shaft, pistons operating in the steam-chamber and having extensions, valve devices, and a hub on the driving-shaft formed in portions; the two inner portions having openings between them through which the extensions of the pistons pass for unrotatably securing the pistons to said driving-shaft.

22. A rotary engine comprising a cylinder having a steam-chamber, a shaft, pistons operating in the steam-chamber, and having hooked extensions, a collar on the shaft having hooked extensions which interlock with the extensions of the pistons and a sectional hub inclosing the collar and having openings for the interlocked extensions.

23. A rotary engine comprising a cylinder having a steam-chamber, a shaft, pistons operating in the steam-chamber and having extensions, an annular collar having extensions interlocking with the extensions of the pistons, and a sectional hub rigidly fastened to the shaft and having an oblong opening for the collar and opposed radial openings for the interlocked extensions.

24. A rotary engine comprising a cylinder having a steam-chamber, a shaft, pistons operating in the steam-chamber and having hooked extensions, and a collar on the shaft having hooked extensions which interlock with the extensions of the pistons; the interlocking hooked extensions corresponding so that rods having continuous straight sides connect the pistons to the collar.

25. A rotary engine comprising a cylinder having a steam-chamber, a shaft, pistons operating in the steam-chamber and having extensions, a collar having extensions interlocking with the extensions of the pistons, and a sectional hub rigidly mounted on the shaft and inclosing the collar and the inner portions of the extensions of the piston.

26. In a rotary engine, the combination with a cylinder having a steam-chamber provided with a valve, a driving-shaft and a piston, of a sectional hub having an inner part rigidly mounted on the shaft, and an outer cam part adjustably mounted on the inner part and valve-operating mechanism controlled by the cam.

27. In a rotary engine, the combination with a cylinder having a steam-chamber provided with a valve, a driving-shaft and a piston, of a sectional hub having an inner part rigidly mounted on the shaft and an outer cam part mounted on the inner part and valve-operating mechanism controlled by the cam; said outer cam part having an outer depression merging in a narrower slot, a segment in the depression and a locking-screw passing through the segment and slot.

HENRY C. HERR.

Witnesses:
W. L. JENKS,
P. H. PHILLIPS.